United States Patent [19]

Blanch et al.

[11] 3,726,961
[45] Apr. 10, 1973

[54] CALCINATED SODIUM ALUMINUM PHOSPHATE, A METHOD OF PREPARING THE SAME AND DENTIFRICE COMPOSITIONS CONTAINING THE SAME

[75] Inventors: Julian E. Blanch, Stamford, Conn.; William J. Kirkpatrick, Peekskill; Thomas J. Sayers, Yonkers, both of N.Y.

[73] Assignee: Stauffer Chemical Company, New York, N.Y.

[22] Filed: Mar. 23, 1971

[21] Appl. No.: 127,372

Related U.S. Application Data

[63] Continuation-in-part of Ser. No. 753,851, Aug. 20, 1968, abandoned.

[52] U.S. Cl. .................................423/306, 424/57
[51] Int. Cl. ........................C01b 15/16, C01b 25/26
[58] Field of Search .............23/105, 106 A, 106 R, 23/107; 424/57; 423/304–318

[56] References Cited

UNITED STATES PATENTS

| 3,574,536 | 4/1971 | Vanstrom | 23/107 |
| 3,311,448 | 3/1967 | Blanch et al. | 23/105 |

Primary Examiner—Oscar R. Vertiz
Assistant Examiner—Gregory A. Heller
Attorney—Wayne C. Jaeschke, Daniel S. Ortiz and Martin Goldwasser

[57] ABSTRACT

An alkali metal aluminum acid orthophosphate that is prepared by reacting an alkali metal compound and a reactive trivalent inorganic aluminum compound with aqueous phosphoric acid to form a crystalline product. The crystalline product is then calcined at a temperature ranging between 300° and 600° C. The calcined product is unexpectedly insoluble in aqueous solutions and exhibits excellent characteristics as a polishing agent when combined with dentifrice formulations.

7 Claims, No Drawings

CALCINATED SODIUM ALUMINUM PHOSPHATE, A METHOD OF PREPARING THE SAME AND DENTIFRICE COMPOSITIONS CONTAINING THE SAME

CROSS-REFERENCE TO RELATED APPLICATION

This application is a continuation-in-part of application Ser. No. 753,851, filed Aug. 20, 1968 and now abandoned.

BACKGROUND OF THE INVENTION

Dentifrice formulations have been produced, ranging from liquids and powders to the highly popular pastes or dental creams. The dental creams are by far the most difficult to compound successfully. They require careful balancing of polishing agent, humectant, water, binder, preservatives, detergents, flavoring, sweeteners and therapeutic agents to produce a smooth homogeneous paste.

Most modern dental cream formulations use one of several phosphate materials as the polishing agent. Examples of the phosphate polishing agents are dicalcium phosphate, anhydrous dicalcium phosphate, tricalcium phosphate, thermally converted dicalcium phosphate and insoluble sodium metaphosphate. The amount of phosphate materials added to the dental formulations will range between about 5 percent and 60 percent by weight.

The most widely used humectants in toothpaste are glycerine and sorbitol. Propylene glycol is also used in small amounts and to a very limited extent. The primary function of humectant as part of the liquid phase is to retain moisture which provides good texture and maintains an attractive glossy appearance when the paste is exposed to air.

The binder employed therein is to prevent separation of the liquid and solid phases. The most conventionally used binders are the seaweed colloids and synthetic derivatives of cellulose, specifically Carrageenan and sodium carboxymethyl cellulose. Others such as gums have been used. Combinations of these binders have also been employed.

Since the natural and synthetic water dispersions of organic binders are subjected to microbial or mold attack, a relatively small amount of preservatives is added to the paste. Examples of preservatives used in the industry are the esters of parahydroxyl benzoates.

The function of the detergents within the dental formulation is to provide greater cleansing action due to the lowering of the surface tension and the sudsing action in the mouth. Among detergents used are sodium N-lauroyl sarcosinate, sodium lauryl sulfate, sulfocolaurate, sodium alkyl sulfoacetate, and sodium dioctyl sulfosuccinate.

Since toothpaste flavoring probably represents the greatest single factor in consumer acceptance, great care has been employed in selecting balanced blends of different essential oils. These are rarely, if ever, used alone. Combinations of principal flavors are wintergreen, peppermint, and sassafras and are used with secondary oils such as pimento, clove and anise.

Saccharin and sodium cyclamate are widely used to improve taste and enhance the flavor qualities of the toothpaste. The synthetic sweeteners may be used in combinations to obtain optimum sweetness and absence of after-taste. Their desirable properties are obtained at very low concentrations and consequently they have negligible influence on the toothpaste consistency.

Since water is such a common element, it is important in obtaining stable toothpaste formulations to employ substantially pure water therein. It is common practice to demineralize the water that is employed.

The therapeutic agents within the dental creams are to prevent decay of the tooth and are commonly in the form of stannous fluorides and sodium fluoride material.

Difficulties have been encountered in using combinations of the above materials in modern dentifrice formulations. Specifically, scavenging of the fluoride ions by the phosphate and calcium containing polishing agents have been experienced. Thus, in formulating a dentifrice composition, a polishing agent must be selected to provide excellent polishing properties and have a very high degree of compatibility with the fluoride system, and in particular should not scavenge the fluoride ion.

The present invention provides a polishing agent which does not contain calcium or silicon and which has a high degree of compatibility with fluoride compositions used in toothpastes. The degree of abrasiveness of the polishing agent of the present invention can be controlled by degree of heat treatment and particle size of the material.

The polishing agent of the present invention is resistant to hydrolysis and provides a toothpaste formulation which is stable under accelerated aging tests and has a long shelf life at ambient temperatures.

BRIEF DESCRIPTION OF THE INVENTION

According to the present invention a new polishing agent has been discovered which consists of calcined alkali metal aluminum acid orthophosphate which has an atomic ratio of alkali metal:aluminum:phosphorus of about 2:3:6. The alkali metal aluminum phosphate polishing agent composition of the present invention is prepared by precipitating the 2:3:6 crystalline composition in a liquid reaction mixture, separating the crystals from the liquid reaction mixture and heating the crystalline material to a temperature of from 300° C. to about 600° C. to form a substantially amorphous material which is resistant to hydrolysis. It is surprising that the material of the present invention can function as a polishing agent within dentifrice formulations since it was well understood in the prior art that such compositions were readily hydrolyzed when admixed with water.

DETAILED DESCRIPTION OF THE INVENTION

The alkali metal aluminum phosphate of the present invention is prepared by diluting phosphoric acid with water to provide a phosphoric acid solution ranging between about 30 and about 75 percent by weight phosphoric acid. The acid solution is charged to a suitable reaction vessel equipped with a stirrer and a reflux condenser. Then, sufficient alkali metal carbonate, such as sodium or potassium carbonate, alkali metal hydroxide, such as sodium or potassium hydroxide, sodium or potassium orthophosphate or mixtures thereof and the like, is charged to this phosphoric acid solution while agitating to provide an atomic ratio of alkali metal:P of about 0.60:1 to about 1.5:1. After the solution clears any undissolved materials can be separated from the reaction mixture then an aluminum compound selected from the group consisting of aluminum hydroxide, aluminum oxide, sodium aluminate, potassium aluminate or mixtures thereof, is charged to the mixture. A sufficient amount is added to give a final ratio of aluminum:phosphorus of from about 1:2 to about 1:4. The temperature of the reaction is adjusted to approximately 60° to 100° C. and maintained at this temperature for approximately six hours with agitation. After this period, the temperature is dropped to below about 60° C. and maintained at this temperature for approximately 15 hours. The solids in the resulting slurry are separated from the liquids. The solids so recovered are washed with water. Cold water is used in the washing until the pH is above about 3.5. Excess water is separated from the solids and the product is effectively dried at a temperature of about 110° to 115° C. to a constant weight. The material so formed has been identified by its x-ray pattern diffraction as corresponding to a compound whose alkali metal:aluminum:phosphorus ratio is about 2:3:6 that is, $Na_2Al_3H_7(PO_4)_6$.

Alternatively the alkali metal aluminum phosphate of the present invention can be prepared by providing a phosphoric acid solution ranging between about 30 and about 75 percent by weight phosphoric acid in a reaction vessel equipped with a stirrer and a reflux condenser. Then an aluminum compound such as alumina, aluminum hydroxide, potassium aluminate mixtures thereof or the like is charged to the reactor while the stirrer is running and the temperature is maintained in the range of 45° to about 75° C. After the reaction is complete any undissolved material can be separated from the reaction mixture if desired. The atomic ratio of aluminum:phosphorus in the reaction mixture is preferably in the range of from about 1:2 to about 1:4 and most preferably in the range of about 1:3. An aqueous solution of an alkali metal composition such as sodium or potassium carbonate or bicarbonate, sodium hydroxide, potassium hydroxide, potassium or sodium orthophosphate or mixtures thereof and the like is mixed rapidly with the aluminum phosphate solution. The ratio of alkali metal:aluminum is preferably between about 0.6:1 to about 1.5:1. The ratio of alkali metal:aluminum:phosphorus in the reaction mixture is not critical as long as the ratios are within the ranges disclosed, but a ratio of alkali metal:aluminum:phosphorus of about 0.75:1:3 has been found to produce an excellent product.

The final concentration of the phosphate calculated as phosphoric acid may vary but the solution usually contains from about 25 to about 50 percent by weight phosphate calculated as phosphoric acid.

The solution is maintained at from about 75° – 95° C. until the crystals of 2:3:6 material form in the solution. The crystals are separated from the hot solution, washed with water and dried at 100°–110° C. It is preferred that the crystals be dried rapidly in a moving air stream.

The temperature at which the crystals are separated from the liquid portion of the reaction mixture is determined by the viscosity of the reaction mixture. At low temperatures the reaction mixtures tend to become highly viscous compositions which make separation of the crystals difficult.

The washed dry crystalline alkali metal aluminum phosphate prepared as above as then calcined at a temperature of from about 300° C. to about 600° C. and most preferably at a temperature from about 400° to about 450° C. It is preferable that the temperature of the crystalline material be raised slowly so that the distal hydroxyl groups may migrate and be removed as water molecules.

After calcining, the particles of crystalline 2:3:6 material has been transformed into a substantially amorphous material having the same particle shape as the crystalline material and a 2:3:6 composition.

In order to effectively utilize the calcined alkali metal aluminum phosphate, it is preferably screened to obtain a uniform size. A 200 mesh (U.S. Sieve Series) or smaller screen can be effectively used to produce the size material desired. In a dentifrice composition this material can be used to replace all or a part of the abrasive or polishing agent in dentifrice formulations.

The rate of hydrolysis of the amorphous material is substantially lower than the crystalline 2:3:6 composition and its degree of abrasiveness has been changed. The degree of abrasiveness (as measured by antimony abrasion values) can be increased by increasing the temperature to which the composition is heated and the length of time the composition is held at the high temperature. In addition, the degree of abrasiveness (as measured by antimony abrasion values) is affected by the particle size of the calcined composition; the larger particle size providing the greater antimony abrasion values.

As used herein, alkali metal denotes sodium or potassium.

The calcined alkali metal aluminum phosphate can be incorporated into toothpaste formulation alone or admixed with other polishing agents. The calcined alkali metal aluminum phosphate is usually present at from about 5 to about 60 percent by weight of the dentifrice formulation and preferably at from about 20 to about 50 percent.

The novel polishing agents provide a stable toothpaste having excellent fluoride compatibility and variable abrasive values which can be prepared to meet the specification for abrasive values required in the toothpaste formulation.

The Examples which follow illustrate the preparation and properties of the novel composition of the present invention.

In the Examples which follow and throughout this specification, all percentages, unless otherwise indicated, are by weight.

EXAMPLE 1

A 3,322 gram portion of an 85 percent solution of phosphoric acid was charged into a five liter reaction vessel equipped with a stirrer, reflux condenser means for heating and cooling the vessel. The stirrer was started and water in the amount of 749 grams was slowly added to the phosphoric acid solution. The temperature was gradually raised to 69° C. Then 749 grams of aluminum hydroxide (commercial Alumina C–31) was added in four portions while the temperature was maintained at about 80° C. At the end of 1 hour and 50 minutes, the solution was clear. The temperature of the solution was raised to 85° C. and a solution of 382.4 grams of sodium carbonate in 1,680 grams of water was slowly added to the agitated aluminum phosphate solution. After 4 and ½ hours at 85° C. nucleation started and a sample was taken. Samples were taken every hour for 10 hours. It was noted that large crystals (about 50 microns in size) were formed which on standing in the mother liquor for about 30 minutes broke apart into 3 – 5 micron crystals of $Na_2Al_3H_7(PO_4)_6 \cdot 4H_2O$. The reaction was complete in 14.5 hours. The hot slurry was poured onto a filter and the crystals were separated from the mother liquor. The filter cake was dispersed in cold water and the resulting slurry was filtered. The washing process continued until the pH of the wash water was 4.5° at 25° C. The filter cake was broken up and air dried overnight at 110° C. The dried material was comminuted and sieved through a No. 325 U.S. Sieve Series screen. The sieved material was heated in large nickel crucibles with covers. The temperature was slowly raised from 240° C. to 400° C. over a 2 hour period with the composition being held at 400° C. for 17 hours. The resulting powder was wet sieved through a No. 325 U.S. Sieve Series screen. The material was dried at 90° to 100° C. to near constant weight.

A sample of the dried material was examined by powder x-ray diffraction methods. Only two or three indiscrete broad haloes appeared in the diffraction pattern which indicated that the material was substantially amorphous.

EXAMPLE 2

The polishing agent described in Example 1 was formulated into a toothpaste having the following compositions by weight.

| | |
|---|---|
| Glycerin | 28.0% |
| Water | 29.4% |
| Polishing Agent of Example 1 | 39.0% |
| Commercial Gum (Viscarine TP-4) | 1.00% |
| Commercial Detergent (Duponol C) | 1.00% |
| Peppermint Oil | 1.0% |
| Preservative (Ethyl Paracept) | 0.1% |
| Stannous Fluoride | 0.4% |
| Saccharin | 0.1% |

The toothpaste was made using the water, gum, preservative, and two thirds of the glycerin. It was heated to 70° C. to effect complete dispersion and cooled back to room temperature. The polishing agent, saccharin and stannous fluoride were then added thereto. The paste was mixed, milled, and remixed. It was then subjected to vacuum and the detergent dispersed in the remaining glycerol was added last with a minimum of mixing.

The dentifrice had a tube life of over two months at 50° C. and a shelf life at room temperature of over two years.

Standard compatibility tests were conducted on the above toothpaste by adding one part by weight of the polishing agent to a 0.1 percent solution of stannous fluoride. The mixture was agitated for one hour and then centrifuged sufficiently to produce a clear supernatant liquid fraction. Fluoride and stannous ion concentrations were then determined on suitable aliquots of the liquid fraction by standard methods of analysis. The percent compatibility is defined as the concentration of fluoride or stannous ions remaining in the liquid extract compared to the concentration originally present in the stannous fluoride solution times 100. These tests indicated a compatibility with the fluoride ion of above 85 percent.

EXAMPLE 3

A 2,350 gram solution of 75 percent phosphoric acid was added to 1,104 grams of water in a 5 liter reaction flask fitted with a stirrer and reflux condenser and means for controlling the temperature. The stirrer was started and 360.8 grams of sodium carbonate was added slowly to the solution and the temperature adjusted to 65° C. The agitation was continued and 356.4 grams of aluminum hydroxide were added to the reaction and the temperature of the mixture was allowed to rise to 85° to 90° C. and was maintained at this level. Crystallization was deemed complete in 24 hours. The product was recovered by filtration and washed with cold water as in Example 1. Washing was continued until the pH was above 4.0. The crystals were oven dried at 90° to 95° C. to near constant weight. The crystals were placed in covered nickel crucibles and the temperature raised to 410° C. over a period of 2 hours and then held at 410° C. for 16 hours. The calcined sodium aluminum phosphate was broken up and wet sieved through a No. 325 U.S. Sieve Series. The product was dried at 90°–100° C.

EXAMPLE 4

The polishing agent described in Example 3 was formulated into a toothpaste having the following composition by weight:

| | |
|---|---|
| Glycerin | 28.0% |
| Water | 29.4% |
| Polishing Agent of Example 3 | 39.0% |
| Commercial Gum | 1.0% |
| Commercial Detergent | 1.0% |
| Peppermint Oil Flavor | 1.0% |
| Preservative | 0.1% |
| Stannous Fluoride | 0.4% |
| Saccharin | 0.1% |

The toothpaste was made using the water, gum, preservative, and two thirds of the glycerin. It was heated to 70° C. to effect complete dispersion and cooled back to room temperature. The polishing agent, saccharin and stannous fluoride were then added thereto. The paste was mixed, milled and remixed. It was then subjected to vacuum and the detergent dispersed in the remaining glycerol was added last with a minimum of mixing.

Standard compatibility tests were conducted on the above toothpaste by adding one part by weight of the polishing agent to a 0.1 percent solution of stannous fluoride. The mixture was agitated for one hour and then centrifuged sufficiently to produce a clear supernatant liquid fraction. Fluoride and stannous ion concentrations were then determined on suitable aliquots of the liquid fraction by standard methods of analysis. The percent compatibility is defined as the concentration of fluoride or stannous ions remaining in the liquid extract compared to the concentration originally present in the stannous fluoride solution times 100. These tests indicated an 85 percent compatibility with the fluoride ion and 24 percent compatibility with the stannous ion.

EXAMPLE 5

Aluminum hydroxide in the amount of 356.4 grams was reacted with 2,350 grams of 75 percent phosphoric acid in a reaction vessel similar to that used in Example 1. The temperature was raised slowly to 95° C. and held there until the solution was clear. The clear solution was diluted at 65°–75° C. with one liter of water containing 10 milliliters of 75 percent phosphoric acid. A solution of 360.8 grams of sodium carbonate and 1,440 grams of water was added to the stirred aluminum phosphate solution. The temperature of the resulting slurry was raised to about 85° C. and maintained at this level for 16 hours. The mother liquor was filtered off and the filter cake slurried with cold distilled water as in Example 1. Subsequent drying, calcining and classifying were conducted in the manner as set forth in Example 1. The calcining temperature was maintained at 110° C. for 16 hours.

EXAMPLE 6

The polishing agent as described in Example 5 was formulated into a toothpaste having the following composition by weight.

| | |
|---|---|
| 95% Glycerin | 15.0% |
| 70% Sorbitol | 18.0% |
| Water | 27.3% |
| Composition of Example 5 | 35.0% |
| Gum | 0.9% |
| Carboxymethyl Cellulose | 0.7% |
| Detergent | 1.5% |
| Peppermint Oil | 0.5% |
| Methyl Salicylate | 0.5% |
| Preservative | 0.1% |
| Stannous Fluoride | 0.4% |
| Saccharin | 0.1% |

Using the standard compatibility tests of Example 2, 83 percent and 23 percent were indicated for the fluoride and stannous ions, respectively.

EXAMPLE 7

The abrasive properties of the polishing agent of this invention were studied and compared to the abrasive property of commercially available polishing agents. Thus, the antimony abrasion tests were conducted thereon by forming a slurry of the dentifrice or polishing agent with water containing sufficient carboxymethyl cellulose to insure that the polishing agent remained in suspension during mild agitation. The slurry is placed in a series of cups into which previously weighed strips of cast antimony metal had been affixed. The metal strips were then brushed with a standard toothbrush using a mechanical brushing machine. The antimony strips were removed, cleaned and reweighed. The abrasion value is defined as the milligrams of antimony lost after 10,000 double brush strokes. An average of several values are indicated below.

TABLE 1

Antimony Abrasion Values

| Polishing Agent | Abrasion Value |
|---|---|
| Dicalcium Phosphate Dihydrate | 3 |
| Tricalcium Phosphate | 2 |
| Dentifrice Example 2 | 8 |
| Dentifrice Example 4 | 19 |
| Dentifrice Example 6 | 13 |

EXAMPLE 8

An indication of the stability of the calcined compositions of the present invention in aqueous systems can be determined by forming a 10 percent aqueous slurry of the calcined composition, measuring the pH of the slurry, then boiling the slurry for 2 hours and again measuring the pH of the slurry. The difference in the pH before an after boiling for 2 hours is an indication of the stability of the composition.

The composition of Example 1 exhibited a pH change of the aqueous phase after boiling for 2 hours of 0.15 pH units. As noted, the dentifrice preparation utilizing this calcined material exhibited stability in accelerated aging of over 50 hours at 50° C. and a shelf life of more than 2 years at ambient temperatures.

EXAMPLE 9

Five samples of a single batch of crystalline material prepared according to the method of Example 1 were calcined. At different times during the calcining the samples were removed from the oven and the Antimony Abrasive Value determined. Table 2 illustrates the results of the tests.

TABLE 2

| Heating Schedule Temperature °C. | Time Hours | Sample | Antimony Abrasion Values Mg. |
|---|---|---|---|
| Ambient Temp. to 120 | Just sufficient time for sample to reach temp. | 1 | 3.2 |
| 120 | 2 | | |
| 120 to 225 | 0.5 | | |
| 225 | 1.0 | 2 | 4.0 |
| 225 to 325 | 1.0 | | |
| 325 | 1.0 | 3 | 4.2 |
| 325 to 400 | 1.0 | 4 | 6.3 |
| 400 | 1.0 | 5 | 7.1 |

What is claimed is:

1. The process for preparing an insoluble substantially amorphous alkali metal aluminum acid orthophosphate having an atomic ratio of alkali metal:aluminum:phosphorus of about 2:3:6 which comprises; preparing a liquid reaction mixture having an atomic ratio of alkali metal:aluminum of from about 0.6:1 to about 1.5:1 and an atomic ratio of aluminum:phosphorus of from about 1:2 to about 1:4 from compounds selected from the group consisting of sodium hydroxide, potassium hydroxide, sodium carbonate, potassium carbonate, sodium bicarbonate, potassium bicarbonate, sodium aluminate, potassium aluminate, sodium orthophosphate, potassium orthophosphate, aluminum oxide, hydrated aluminum oxide and orthophosphoric acid; maintaining the liquid reaction mixture between about 60° C. and 100° C. until a crystalline product having an atomic ratio of 2:3:6 precipitates from the liquid reaction mixture, separating said crystalline product from the liquid reaction mixture and calcining said crystalline product between about 300° C. and about 600° C. for a sufficient length of time to produce an insoluble substantially amorphous material useful as a dentifrice polishing agent.

2. The process as set forth in claim 1 wherein the crystalline product is washed with water after separation from the reaction mixture until the pH of the wash water is above about 3.5.

3. The process as set forth in claim 1 wherein said crystalline product is calcined at a temperature ranging between about 400° and 450° C.

4. The process of claim 1 wherein the liquid reaction mixture is maintained between about 85° C. and 90° C. until the crystals precipitate.

5. The process of claim 1 wherein the trivalent aluminum containing compound is reacted with phosphoric acid before the addition of the alkali metal compound.

6. The process of claim 1 wherein the alkali metal compound is reacted with orthophosphoric acid before the trivalent aluminum compound is added to the reaction mixture.

7. The process of claim 1 wherein the liquid reaction mixture contains an atomic ratio of alkali metal:aluminum:phosphorus of about 0.75:1:3.

* * * * *